US008192123B2

(12) United States Patent
Ernst et al.

(10) Patent No.: US 8,192,123 B2
(45) Date of Patent: *Jun. 5, 2012

(54) DRYWALL FASTENER

(75) Inventors: Richard Ernst, San Diego, CA (US); John P. Grimm, Santee, CA (US)

(73) Assignee: Illinois Tool Works Inc., Glenview, IL (US)

( * ) Notice: Subject to any disclaimer, the term of this patent is extended or adjusted under 35 U.S.C. 154(b) by 992 days.

This patent is subject to a terminal disclaimer.

(21) Appl. No.: 11/832,311

(22) Filed: Aug. 1, 2007

(65) Prior Publication Data

US 2008/0019792 A1 Jan. 24, 2008

Related U.S. Application Data

(63) Continuation-in-part of application No. 11/148,158, filed on Jun. 8, 2005, now abandoned, which is a continuation-in-part of application No. 10/939,795, filed on Sep. 13, 2004, now Pat. No. 7,160,074, and a continuation-in-part of application No. 10/844,706, filed on May 12, 2004, now Pat. No. 7,934,895.

(60) Provisional application No. 60/842,478, filed on Sep. 6, 2006, provisional application No. 60/510,708, filed on Oct. 10, 2003.

(51) Int. Cl.
    *F16B 25/10* (2006.01)
(52) U.S. Cl. ........................ 411/387.1; 411/411; 411/426
(58) Field of Classification Search .................. 411/426, 411/387, 411, 386, 387.1–387.4, 387.6, 387.8
    See application file for complete search history.

(56) References Cited

U.S. PATENT DOCUMENTS 3,641,866 A    2/1972   Mortensen
(Continued)

FOREIGN PATENT DOCUMENTS

CN          2217705 Y       1/1996
(Continued)

OTHER PUBLICATIONS

SPIT, Mini DRIVA produc, 1 page, Mar. 10, 2005, France, from website http://www.spit.fr/produits/imprProd.php?prod=31&langue=fr.

(Continued)

*Primary Examiner* — Victor Batson
*Assistant Examiner* — Roberta Delisle
(74) *Attorney, Agent, or Firm* — Mark W. Croll; Patricia M. Chidiac; Beem Patent Law Firm (57) ABSTRACT

A self-drilling fastener for use in a friable material with or without an underlying member at the point of use comprises an elongated body, a threaded exterior, an enlarged head with torque transmitting surfaces, proximal, intermediate, and distal portions, and a drilling tip generally opposite enlarged head. Proximal portion has an axial length, a threaded exterior having root and crest diameters and a thread height, where the crest diameter is about twice the root diameter. Intermediate portion has an axial length, a threaded exterior having a root, a crest diameter substantially smaller than proximal portion crest diameter and a thread height substantially smaller than proximal portion thread height. Distal portion has an axial length, a threaded exterior with a root that tapers toward the drilling tip, a crest diameter substantially smaller than the proximal portion crest diameter, and a thread height substantially smaller than the proximal portion thread height portion.

20 Claims, 4 Drawing Sheets

U.S. PATENT DOCUMENTS

| | | | |
|---|---|---|---|
| 3,665,801 A * | 5/1972 | Gutshall | 411/387.7 |
| 3,703,843 A * | 11/1972 | Laverty | 411/413 |
| 4,028,987 A * | 6/1977 | Wilson | 411/387.2 |
| 4,441,619 A | 4/1984 | Gibitz | |
| 4,601,625 A | 7/1986 | Ernst | |
| 4,763,456 A | 8/1988 | Giannuzzi | |
| 4,892,429 A | 1/1990 | Giannuzzi | |
| 5,039,262 A | 8/1991 | Giannuzzi | |
| 5,160,225 A | 11/1992 | Chern | |
| 5,190,425 A | 3/1993 | Wieder et al. | |
| 5,234,299 A | 8/1993 | Giannuzzi | |
| 5,308,203 A | 5/1994 | McSherry et al. | |
| 5,482,418 A | 1/1996 | Giannuzzi | |
| 5,529,449 A | 6/1996 | McSherry et al. | |
| 5,536,121 A | 7/1996 | McSherry | |
| 5,558,479 A | 9/1996 | McElderry | |
| 5,692,864 A | 12/1997 | Powell et al. | |
| 5,752,792 A | 5/1998 | McSherry | |
| 5,833,415 A | 11/1998 | McSherry | |
| 5,863,167 A * | 1/1999 | Kaneko | 411/426 |
| 5,882,162 A * | 3/1999 | Kaneko | 411/411 |
| 5,944,295 A | 8/1999 | McSherry | |
| 5,991,998 A * | 11/1999 | Kaneko | 29/432.2 |
| 6,079,921 A | 6/2000 | Gauthier et al. | |
| 6,139,236 A | 10/2000 | Ito | |
| 6,186,716 B1 | 2/2001 | West et al. | |
| 6,196,780 B1 | 3/2001 | Wakai et al. | |
| 6,250,865 B1 | 6/2001 | McSherry | |
| 6,264,677 B1 * | 7/2001 | Simon et al. | 606/232 |
| 6,354,779 B1 | 3/2002 | West et al. | |
| 6,382,892 B1 | 5/2002 | Hempfling | |
| 6,419,436 B1 * | 7/2002 | Gaudron | 411/426 |
| 6,676,350 B1 | 1/2004 | McSherry et al. | |
| 7,040,850 B2 | 5/2006 | Gaudron | |
| 7,713,013 B2 * | 5/2010 | Sedgwick et al. | 411/411 |
| 2004/0146377 A1 * | 7/2004 | Chen | 411/387.4 |
| 2005/0008450 A1 * | 1/2005 | Gauthier | 411/387.1 |
| 2005/0031434 A1 | 2/2005 | Guadron | |
| 2005/0079027 A1 * | 4/2005 | Ernst et al. | 411/44 |
| 2005/0084360 A1 * | 4/2005 | Panasik et al. | 411/44 |
| 2006/0018730 A1 | 1/2006 | Ernst | |

FOREIGN PATENT DOCUMENTS

| | | |
|---|---|---|
| DE | 545634 C | 2/1932 |
| DE | 40 16 724 | 11/1991 |
| DE | 295 02 052 U | 3/1995 |
| DE | 295 09 487 U | 3/1995 |
| DE | 93 01 098 | 1/1997 |
| DE | 19 852 339 | 5/2000 |
| DE | 201 11 194 | 10/2001 |
| EP | 0 400 535 | 12/1990 |
| EP | 0 874 165 B1 | 10/1998 |
| EP | 0 951 869 | 10/1999 |
| EP | 0 965 767 A1 | 12/1999 |
| EP | 1 001 178 A2 | 5/2000 |
| EP | 1 004 781 | 5/2000 |
| EP | 1 298 331 A | 2/2003 |
| EP | 1 522 744 A1 | 4/2005 |
| FR | 439431 | 1/1912 |
| FR | 439432 | 1/1912 |
| GB | 1 487 032 | 7/1975 |
| GB | 2 357 130 A | 6/2001 |
| JP | 1969002509 Y | 1/1969 |
| JP | 1976141227 U | 5/1976 |
| JP | 1979092257 U1 | 12/1979 |
| JP | 1991121604 U1 | 12/1991 |
| JP | 1994076502 U | 10/1994 |
| JP | 10047330 A | 2/1998 |
| JP | H10-97330 A | 2/1998 |
| JP | 10061633 A | 3/1998 |
| JP | 11190315 A | 7/1999 |
| JP | 19980016385 | 7/1999 |
| JP | 2000027828 A | 1/2000 |
| JP | 2000320519 A | 11/2000 |
| JP | 2005121224 A | 5/2005 |
| WO | WO 99/05420 | 2/1999 |
| WO | WO 2004/053341 | 6/2004 |
| WO | WO 2004/079209 | 9/2004 |
| WO | WO 2004/079210 | 9/2004 |
| WO | WO 2005/038275 | 4/2005 |
| WO | WO 2006/031421 | 3/2006 |

OTHER PUBLICATIONS

SPIT Mini DRIVA product sheets Nov. 23, 2004 (2 pages).

Search report for PCT/US2006/020693.

PCT Notification of Transmittal of The International Search Report and The Written Opinion of the International Searching Authority, or the Declaration, European Patent Office (ISA) Mailing Date Oct. 23, 2008, 15 pages.

* cited by examiner

DRYWALL FASTENER

This application claims the benefit of U.S. Provisional Application No. 60/842,478, filed on Sep. 6, 2006. It also is a continuation-in-part of U.S. patent application Ser. No. 11/148,158, filed on Jun. 8, 2005 and now abandoned, which is a continuation-in-part of U.S. patent application Ser. No. 10/939,795, filed on Sep. 13, 2004 and now issued as U.S. Pat. No. 7,160,074, and of U.S. patent application Ser. No. 10/844,706, filed on May 12, 2004 now U.S. Pat. No 7,934,895, which claims priority to U.S. Provisional Application No. 60/510,708, filed on Oct. 10, 2003.

BACKGROUND OF THE INVENTION

1. Field of the Invention

The present invention is directed to a drywall fastener for use in a friable material, including a self-drilling drywall fastener to be used in drywall mounted to a stud member or the like.

2. Description of the Related Art

Because drywall is a friable material, mounting articles thereto can be difficult. In the past, at least three methods have been used. For light weight articles, small plastic expansion anchors have been used. These expansion anchors have typically required three steps to install: first, a hole is drilled into the drywall; second, the drywall fastener insert is driven into the drilled hole; and finally, a threaded fastener is advanced into the drywall fastener, spreading the drywall fastener into engagement with the drywall. However, expansion anchors can typically hold light loads only.

For heavy duty applications, toggle bolts have been used. While toggle bolts have been effective, they are also generally expensive because they involve parts which must move relative to one another. Toggle bolts also have been known to be difficult to install.

Self-drilling anchors for mounting heavier loads also have been used. These self-drilling anchors typically are installed by drilling into the drywall with the drywall fastener itself. The drywall fastener also includes threading having a high thread height to provide a high pullout in the drywall. Examples of self-drilling anchors include the drywall fastener sold under the trademark E-Z ANCOR manufactured by ITW Buildex, and those disclosed in U.S. Pat. Nos. 4,601,625, 5,190,425, and 5,558,479, all of which are assigned to the assignee of this application.

Self-drilling anchors have proved effective for holding higher loads when installed in drywall alone. However, in most cases the drywall is mounted to wood support members, or studs, that are unseen by the user, and typically the location of these support members are unknown and unchecked by the user. When a user of a typical self-drilling fastener attempts to install the drywall fastener in drywall at a location of a support member, the drywall fastener is unable to drill into the support member, causing the drywall fastener to spin in place so that the drywall fastener's high threading strips out the drywall, resulting in failure of the drywall fastener and creating an unsightly scar on the wall. Even if the drywall fastener is able to drill into the support member slightly, the anchors have been known to tightly engage the support member and break due to torsion on the anchor.

To install hooks, holders, or the like in drywall, many consumers use ordinary wood screws. While these may appear to work initially, the threads are generally too closely spaced and too low to achieve adequate contact with the drywall. Most commonly, these types of screws tend to bore a hole in the drywall, rather than gripping the drywall, leading to poor holding ability. Unless the installer locates a stud behind the drywall in which to drive the screw, an unsatisfactory result usually follows. While the use of anchors as described above generally overcomes this problem, existing anchors are usually unable to penetrate and attach to a stud or other structure behind the drywall, and require the multi-step installation process, i.e., initially centering and driving the anchor and then driving the proper fastener into the anchor to hold the object to be mounted to the wall. In some cases, the process may require pre-drilling of a pilot hole for the anchor, adding yet another step to the process. Also, it is important to utilize the proper screw or other fastener which properly fits and grips the anchor in order to obtain a secure installation. The provision of a suitable self-drilling drywall screw would greatly simplify this process.

What is needed is a self-drilling fastener for use in drywall that can be installed either in drywall, or in drywall and a support member, and is capable of handling a heavy load.

BRIEF SUMMARY OF THE INVENTION

A novel self drilling drywall fastener is provided for use in a friable material mounted on support member. The self drilling drywall fastener comprises a thin, elongate body having an axis, an exterior thread having a root, a proximal end, and a drilling end opposite the proximal end; wherein the exterior thread and said root together provide sufficient structural support to said body to withstand a torsion force required for the drilling end to penetrate a substrate adjacent the friable material, the substrate having a hardness greater than the hardness of the friable material.

In one embodiment, the self drilling drywall fastener comprises the self drilling fastener including an elongated body having an axis, an axial bore adapted to receive an elongated fastener, a enlarged head having torque transmitting surfaces therein, a proximal portion, an intermediate portion, a distal portion, and a drilling tip generally opposite the flared end, wherein the proximal portion has a threaded exterior having a root, a crest diameter, and a thread height, the intermediate portion has a threaded exterior having a root, a crest diameter substantially smaller than the crest diameter of the proximal portion, and a thread height substantially smaller than the thread height of the proximal portion, and the distal portion has a threaded exterior with a root that tapers toward the drilling tip, a crest diameter substantially smaller than the crest diameter of the proximal portion, and a thread height substantially smaller than the thread height of the proximal portion.

A method is provided for installing a self drilling fastener in a friable material and a substrate adjacent thereto, the substrate having a hardness greater than the hardness of the friable material. The method comprises the steps of providing an anchor comprised of thin-walled, elongate body having an axis, an exterior thread having a root, a proximal end, and a drilling end opposite the proximal end; and applying a torsion force to said fastener to drive the drilling end through the friable material and into the substrate, wherein the exterior thread and said root together provide sufficient structural support to said body for said body to withstand such torsion force.

A method of making a self drilling drywall fastener is also provided having the steps of providing a mold having a cavity with an enlarged head, a proximal section, an intermediate section, a distal section, a second end generally opposite said head; said proximal section having interior threading with a root, a crest diameter, and a thread height; said intermediate section having interior threading with a root, a crest diameter substantially smaller than said crest diameter of said proximal section, and a thread height substantially smaller than said thread height of said proximal section; and said distal section having a root that tapers toward said second end, a crest diameter substantially smaller than said crest diameter of said proximal section, and a thread height substantially smaller than said thread height of said proximal section; feeding molten material into said cavity; setting said molten material to form said anchor; and removing said self drilling fastener from said mold.

These and other features and advantages are evident from the following description of the present invention, with reference to the accompanying drawings.

DETAILED DESCRIPTION OF THE INVENTION

The figures have been renumbered from U.S. Provisional Application No. 60/842,478 to number the first embodiment (described immediately below) as FIGS. 11-15. The third embodiment (described below) is shown in FIGS. 1-5 and 16-18 in the instant application.

Referring to FIGS. 11-15, a novel self-drilling drywall fastener 10 is shown. Here, drywall fastener 10 is described in its general aspects and then, below, with respect to several exemplary embodiments, including the wide-body embodiment shown in FIGS. 1-5 and 16-18.

Drywall fastener 10 is for use in a friable material, such as drywall, mounted on a member, such as a support member or stud, the novel drywall fastener 10 having an elongated body 12 with an axis 6, an enlarged head 14 having torque transmitting surfaces 15 therein, a proximal portion 18 proximate enlarged head 14, an intermediate portion 20, a distal portion 22, and a drilling tip 16 generally opposite enlarged head 14. The proximal portion 18 has a threaded exterior, such as drywall gripping threading 19, having a root 26, a crest 27 with a crest diameter DC, and a thread height DH. The intermediate portion 20 has a threaded exterior, such as member gripping threading 21, having a root 28, a crest 29 with a crest diameter MC substantially smaller than drywall gripping threading crest diameter DC, and a thread height MH substantially smaller than drywall gripping thread height DH. The distal portion 22 has a threaded exterior, such as drilling threading 23, having a root 30 that tapers toward drilling tip 16, a crest 31 with a crest diameter TC substantially smaller than drywall gripping threading crest diameter DC, and a thread height TH substantially smaller than drywall gripping thread height DH.

Drywall fastener 10 is for driving into drywall for mounting an article to drywall. Drywall fastener 10 can be used in a manner similar to traditional fasteners when it is being installed in drywall. However, drywall fastener 10 includes features that allow drywall fastener 10 to increase the amount of load that the friable material can withstand, and also allow drywall fastener 10 to penetrate and engage in a support member, such as a wood support stud, and that provide added strength to withstand the large forces of driving drywall fastener 10 into drywall and support member.

The friable material can be one of several friable materials used in construction wherein it is desired to mount an article to the friable material in order to increase the amount of load that the friable material can withstand. An example of the friable material is gypsum based drywall, such as the gypsum drywall sold under the trademark SHEETROCK by United States Gypsum. Drywall typically has a thickness T of ½ inch or ⅝ inch, but it can be obtained in other thicknesses, such as ⅜ inch.

Typically, friable materials such as drywall are mounted to a member, such as a wood structural support member, plywood, or another friable material, such as another layer of drywall. The member can be a support member, such as a wood support member, for example a 2×4 stud or the like, evenly spaced from other wood studs, e.g. every 16 inches, or a metal support member, such as a steel support stud. Support members are substantially more resistant to pullout than drywall because they are much less likely to break apart. Although drywall fastener 10 can be used on drywall mounted to another sheet of drywall, or other friable materials, the present invention will be described for use with support members such as a wood support stud.

Drywall fastener 10 can have different lengths to accommodate different thicknesses of article to be mounted to the drywall. Drywall fastener 10 is designed so that it can be used if the article is relatively thin or relatively thick, in which case drywall fastener 10 may have a greater length to achieve full engagement with the drywall. Ideally, the length of drywall fastener 10 is selected to limit the depth of embedment in the stud or other support member, thereby reducing the associated installation torque, and drive time, so that a user can install a plurality of drywall fasteners 10 in a relatively short period of time with a minimum of effort.

Distal Portion

Turning back to FIGS. 11-13, distal portion 22 allows drywall fastener 10 to drill through drywall and support member as it may be driven manually by a user so that a separate pre-drilling step is not needed. Distal portion 22 includes a drilling tip 16, and in one embodiment, shown in FIG. 12, drilling tip 16 is generally conical in shape and is coaxial with body 12 so that drilling tip 16 comes to point 46 at body axis 6. The drilling tip 16 includes a sharp point 46 to quickly engage and penetrate the surface of the drywall and the front surface of the stud or support member.

Figure 11:
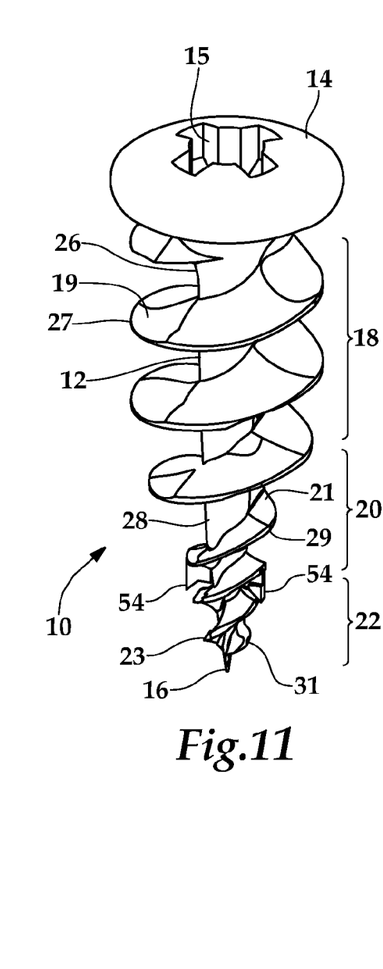
FIG. 11 is a perspective view of another embodiment of a self drilling drywall fastener.
Figure 12:
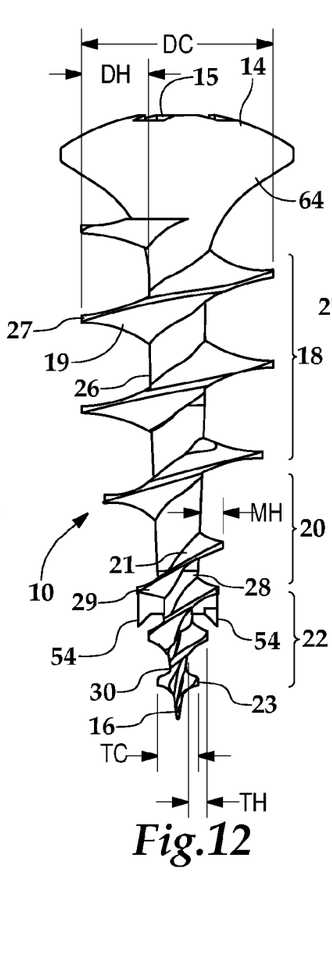
FIG. 12 is a side view of the self drilling drywall fastener of FIG. 11.
Figure 13:
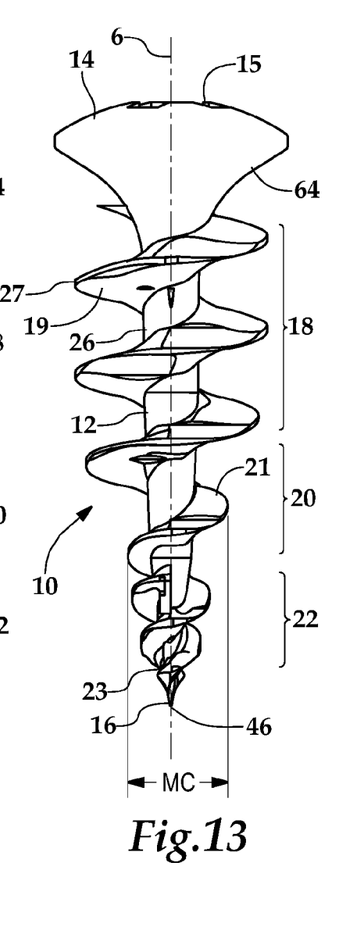
FIG. 13 is a side view of the self drilling drywall fastener, rotated 90° from the view of FIG. 11.
Figure 14:
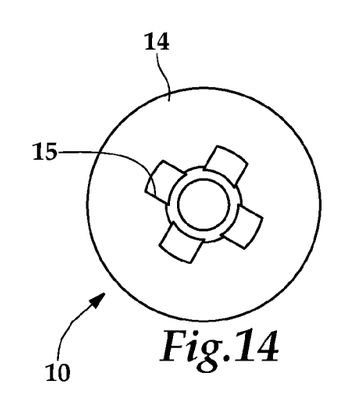
FIG. 14 is a top view of the self drilling drywall fastener of FIG. 11.

Distal portion 22 includes a threaded exterior having drilling threading 23 disposed on distal portion 22 for engaging drywall and support member. Drilling threading 23 includes a root 30 and a crest 31 having a crest diameter TC substantially smaller than drywall gripping threading crest diameter DC, and a thread height TH substantially smaller than drywall gripping thread height DH. Drilling thread height TH is also small enough so that the installation torque into the support member may be achieved manually by the typical user so that drywall fastener 10 can be driven into the support member. Threading 23 can also include a radius of curvature between the base of the thread 23 and root 30, to prevent the formation of stress concentrations at base of thread 23.

Continuing with FIGS. 12 and 13, drilling threading root 30 tapers from intermediate portion 20 toward drilling tip 16 so that the cross sectional area of drilling threading root 30 proximate drilling tip 16 is reduced with respect to the cross sectional area at intermediate portion 20. Thread height TH of drilling threading 23 remains substantially constant along the length of distal portion 22. However, because root 30 is relatively small, particularly at drilling tip 16, thread height TH can be larger, for example larger than thread height MH of member gripping threading 21, because the small root 30 allows a larger thread height without an overly large crest diameter TC.

Distal portion threading 23 and intermediate portion threading 21 engage drywall and drive drywall fastener 10 through drywall. If drywall fastener 10 is driven into a location wherein a support member is located behind drywall, drilling tip 16 hits support member, and if support member is relatively hard with respect to drywall, e.g., a wood support stud, then drywall fastener 10 typically spins within drywall without axially advancing into support member 10, referred to herein as stalling. As drywall fastener 10 stalls, distal portion threading 23 and intermediate portion threading 21 drill a hole of a predetermined size in drywall while drilling tip 16 drills into support member. Eventually drilling tip 16 drills to a depth into support member, usually between about ⅛ inch and about ¼ inch, that allows distal portion threading 23 to engage support member and begin pulling drywall fastener 10 through support member and drywall so that drywall gripping threading 19 can engage drywall.

It has been found that the size of the hole drilled into drywall by intermediate portion threading 21 is important in the grip created between drywall and drywall gripping threading 19, particularly if drywall fastener 10 is driven into drywall only. It has been found that for drywall threading having a crest diameter of about ½ inch, it is ideal for the hole drilled in the drywall to have a diameter of about ¼ inch. Therefore, distal portion 22 is designed to drill out a hole in drywall that generally maximizes to the extent practically attainable the pullout strength of drywall fastener 10 in drywall.

Continuing with FIG. 12, distal portion 22 can include at least one wing 54 that protrudes radially outwardly from distal portion 22 to ream out drywall to form a hole having a predetermined diameter selected to maximize pullout strength in drywall, particularly when drywall fastener 10 is driven into drywall only, with no support member behind the installation location. The wing 54 may extend to a distance from axis 6 that is approximately equal to the root radius of proximal portion 18 near head 14, wherein the root radius is half of the root diameter. Wings 54 are designed to break away when they hit support member so that wings 54 do not ream out support member, but only ream out drywall.

In the embodiment shown in FIG. 12, distal portion 22 includes a pair of wings 54 that protrude radially outwardly from distal portion 22. Wings 54 are evenly spaced around the perimeter of distal portion 22 so each of a pair of wings 54 are about 180° apart. Wings 54 protrude radially outwardly so that a width across wings 54 is approximately equal to root diameter of proximal portion 18 near head 14. If the hole reamed out by wings 54 is approximately equal to root diameter, the wings 54 ream out only as much drywall as is necessary, leaving behind a maximum amount of drywall for engagement with drywall gripping threading 19.

If, when drilling tip 16 hits support member, there is a momentary stall as drilling tip 16 drills into support member, as described above, the threading on drywall fastener 10 may begin to strip away a portion of the drywall. For this reason, it is important that drilling threading 23 engage support member and that distal portion 22 drill into support member quickly so that drywall fastener 10 does not excessively strip out drywall before being driven forward. Drilling threading 23 extends to an axial position that is as close to drilling tip 16 as possible so that drilling threading 23 can more quickly engage with support member. In one embodiment, drilling threading 23 extends substantially to said drilling tip 16 so that a lead of drilling threading 23 is axially spaced from drill tip point 46 by between about 0 inches, wherein drilling threading 23 extends substantially all the way to drilling tip 16, and about 0.06 inch. Ideally, the drilling threading 23 extends all the way to drilling tip 16, i.e. no space between tip point 46 and lead, however, it has been found that for a drilling tip that comes to a point, wherein the root essentially has a diameter of 0 inches, the drilling threading actually becomes axial, which can make it difficult for the drilling threading to engage support member. For this reason, the lead of drilling threading 23 can be spaced slightly from drilling tip 16, e.g. at about 0.02 inch.

Continuing with FIGS. 11 and 12, external threading 23 of distal portion 22 can include two generally helical threads arranged in a double helix. The double helix configuration of threads provides added support around distal portion 22 to help prevent distal portion 22 from collapsing due to the torsional forces of driving drywall fastener 10 into support member. Double helix threads also provide balanced driving into support member and faster engagement of drilling tip 16 with support member. In addition, the double lead threads extend to an axial position proximate to drilling tip 16 so that drywall fastener 10 can quickly engage and drill into support member.

Each thread of the double helix may have substantially the same pitch so that one of the threads does not overtake the other. The second thread may be spaced axially from first thread by approximately half the pitch of threads, i.e., about 0.1 inch for a pitch of about 0.2 inch, so that at every axial position along distal portion 22, there is a thread on either side providing structural support. The threads of a double helix may have substantially the same thread height.

A first thread of the double helix may continue as a thread 21 on intermediate portion 20 while a second thread is only present on distal portion 22. Both threads can also continue in a double helix on intermediate portion 20 (not shown) to provide structural support for intermediate portion 20 as well as distal portion 22. If second thread is extended onto intermediate portion 20, it provides improved grip with the support member.

Intermediate Portion

Returning to FIGS. 12 and 13, member gripping threading 21 is disposed on intermediate portion 20 and includes a root 28 and a crest 29 having a crest diameter MC substantially smaller than drywall gripping threading crest diameter DC. In the embodiment shown in FIG. 12, root 28 of intermediate portion 20 may taper slightly toward distal portion 22 so that the torque required to install drywall fastener 10 will be minimized, particularly in wood support members, because it allows the root diameter and crest diameter MC of intermediate portion 20 to be smaller. In one embodiment, member gripping threading root 28 tapers at an angle of between about ½ degree and about 4 degrees, and in one embodiment, about 2¼ degrees.

The largest crest diameter MC of intermediate portion 20 may be selected to maximize the gripping between drywall gripping threading 19 and drywall, particularly when drywall fastener 10 is to be installed in drywall only. For example, for a drywall fastener 10 to have a drywall gripping threading crest diameter DC of about ½ inch, it is desired that the largest member gripping crest diameter MC be about ¼ inch or smaller.

In contrast to drywall gripping threading 19, described below, member gripping threading 21 has a thread height MH that is substantially smaller than the thread height DH of drywall gripping threading 19. The crest diameter MC of intermediate portion 20 is also substantially smaller than the crest diameter DC of proximal portion 18 so that the required installation torque in a support member, such as a wood stud, is not excessive. The crest diameter MC and thread height MH of member gripping threading 21 may be selected so that it is small enough that it does not scar or tear drywall when drywall fastener 10 stalls when drilling into support member, described above, and so that member gripping threading 21 does not engage drywall during stalling, which could jack drywall away from support member.

Although larger thread heights MH, TH of intermediate portion 20 and distal portion 22 would result in higher pullout strength within support member, it would also greatly increase the torque required to drive drywall fastener 10 into wood or other support member materials, making it difficult for a user to install drywall fastener 10, particularly with a hand-driven screwdriver. Therefore, thread height MH, TH should be chosen to allow for an acceptable torque in the event that some part of the intermediate portion 20 is driven into support member.

In the embodiment shown in FIG. 11, threading 21 of intermediate portion 20 is one generally helical thread 21 and is a continuation of drilling thread and extends on to drywall engaging thread 19 (described below). External threading 21 of intermediate portion 20 can also be a double helix similar to the double helix shown in distal portion 22 to provide added structural support on intermediate portion 20. Intermediate threading 21 can also have a radius of curvature between the base of thread 21 and root 28 to prevent the formation of stress concentration along the base of thread 21.

The combined length of intermediate portion 20 and distal portion 22 is larger than the thickness of the drywall so that when drywall fastener 10 stalls before beginning to drill into support member, the larger crested threading 19 of proximal portion 18 (described below) is not engaged with drywall, which would tend to strip out the drywall. This length should also be long enough so that distal portion 22 completes its drilling of drywall before drywall gripping threading 19 begins to engage drywall, particularly when drywall fastener 10 is driven into drywall only. This is desirable because drilling into a material tends to axially advance through the material substantially slower than driving through the material with threading. For example, drywall fastener 10 is driven axially through drywall by drywall gripping threading 19 much faster than drywall fastener 10 can drill into drywall. If the drilling step is not completed before drywall gripping threading 19 begins to engage drywall, it is likely that drywall gripping threading 19 will strip out drywall rather than drive drywall fastener 10 through it. Additionally, it is important to properly proportion the lengths of intermediate portion 20 and distal portion 22 to the installation torques required to drive drywall fastener 10, particularly into support member.

Proximal Portion

Returning to FIGS. 11-14, proximal portion 18 includes an exterior thread for engagement with drywall when drywall fastener 10 is installed so that the load of an article (e.g., if the article is a hook or holder, the load to be suspended or supported by the hook or holder) to be held by the fastener will be supported by drywall, particularly if drywall fastener 10 is driven into drywall only. Drywall gripping threading 19 taps a mating thread in drywall so that an engagement between drywall gripping threading 19 and drywall is accomplished. The threaded exterior includes threading 19 disposed on proximal portion 18 having a crest 27 with a crest diameter DC and a root 26. Drywall gripping threading 19 is high threading wherein the distance between crest 27 and root 26, or the thread height DH, is large relative to member gripping threading 21 and drilling threading 23. High drywall gripping threading 19 helps to maximize the surface area of drywall gripping threading 19 encountered by drywall, increasing the pullout strength. The thread height DH of drywall gripping threading 19 is substantially larger than the thread heights MH, TH of member gripping threading 21 and drilling threading 23, which provides for higher pullout strength in drywall. The diameter DC of drywall gripping threading crest 27 can remain essentially the same along the entire length of proximal portion 18. In one embodiment, the diameter DC of crest 27 is at least twice the diameter of root 26.

Figure 15:
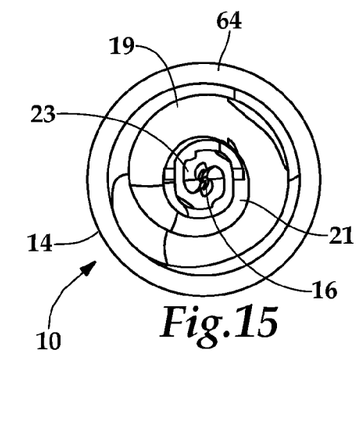
FIG. 15 is a bottom view of the self drilling drywall fastener of FIG. 11.

Turning to FIG. 15, approximately ¾ of a turn of drywall gripping threading 19 may be engaged behind drywall so that drywall engaging threading engages the paper on the rear surface of drywall. Engaging paper on drywall rear surface is particularly desirable when driving drywall fastener 10 into drywall only, because it has been found that engagement with the paper provides a substantial portion of the grip between drywall fastener 10 and drywall. Drywall gripping threading 19 is not intended to be driven into support member because the high drywall gripping threading 19 would require a very high torque to drive drywall fastener 10 into support member.

Returning to FIGS. 12 and 13, the root 26 of proximal portion 18 can be tapered toward intermediate portion 20, and so that the diameter of root 26 at the top of proximal portion 18 is larger than the diameter of root 26 at the bottom of proximal portion 18. In the embodiment shown in FIG. 12, tapered root 26 of proximal portion 18 and tapered root 28 of intermediate portion 20 are generally continuous and taper at approximately the same angle.

In the embodiment shown in FIGS. 11-13, exterior threading 19 of proximal portion 18 is one thread 19 that is a continuation of member gripping thread 21, except that drywall gripping threading 19 has a substantially larger crest diameter DC and a substantially larger thread height DH than the crest diameter MC and thread height MH of intermediate portion 20. In one embodiment, crest diameter DC of proximal portion 18 is about twice the crest diameter MC of intermediate portion 20.

There may be a transition zone between intermediate portion 20 and proximal portion 18 wherein the crest diameter and thread height enlarge from member gripping thread 21 to drywall gripping thread 19. In one embodiment, the transition zone extends for about ¾ of a thread turn. Drywall gripping threading 19 is generally helical, as best shown in FIG. 11. Drywall gripping threading 19 can also be a double helix of two threads, as described above, wherein one of the threads of the double helix can be a fine thread having a substantially smaller thread height than the thread height DH of drywall gripping thread 19. This second thread would provide added strength to drywall fastener 10. Drywall gripping thread 19 can also include a radius of curvature between the base of the thread 19 and root 26 to minimize stress concentration at the base of drywall thread 19.

The length of proximal portion 18, including head 14, may be about equal to, or may be slightly larger than, the thickness of the drywall, so that there is a portion of drywall gripping threading 19 behind drywall rear surface to engage rear surface paper. The length DL of proximal portion 18 may be selected to balance the length of drywall gripping threading 19 engaging the paper on the rear surface of drywall with the torque required to drive that length of drywall gripping threading 19 into a support member, if drywall fastener 10 is driven into a location where a support member is located. In addition, it is desirable that drywall fastener 10 be usable with different thicknesses of drywall, so that a certain length of proximal portion 18 may allow threading 19 to engage rear surface paper in one thickness of drywall, but may be too short to engage rear surface paper in a thicker drywall, or conversely, proximal portion 18 may be too long so that too much of drywall gripping threading 19 must be driven into a support member for a thinner drywall, resulting in a higher required installation torque.

The pitch of drywall gripping threading 19 is chosen so that there is at least one full turn of drywall gripping threading 19 in drywall. This pitch (of drywall gripping threading 19) may be chosen so that between about 1¾ turns and about 2¼ turns, and ideally about 2 full turns of drywall gripping threading 19 may be embedded in drywall. In one embodiment, for drywall having a thickness of ½ inch or ⅝ inch, the pitch P of drywall gripping threading 19 is between about ⅛ inch and about 0.3 inch, and in one embodiment, about 0.2 inch. Preferably, the pitch of drywall gripping thread 19 is generally equal to the pitches of member gripping threading 21 and drilling thread 23. In one embodiment (not shown) the pitch of drywall gripping threading 19 proximate intermediate thread 20 has a larger pitch than the remaining thread 19 proximate enlarged head 14. When this larger pitched threading engages drywall, it pulls drywall fastener 10 into drywall relatively fast, helping to counteract any jacking, or lifting of the drywall away from the support member, that may tend to occur.

Head

Turning to FIGS. 11-14, a surface 64 on the underside of the enlarged head 14 of drywall fastener 10 has an enlarged outer diameter with respect to drywall gripping threading root 26 to allow head 14 to grip an article to be fastened on drywall front surface. In one embodiment, head 14 has a head diameter of between about 0.45 inch and about 0.6 inch, and in one embodiment, about 0.515 inch. The head 14 also includes torque transmitting surfaces 15 so that drywall fastener 10 can be rotated with a driver by the user. The head 14 can include a recess 15 for receiving the tip of a driver wherein recess 15 is configured with torque transmitting surfaces 15 for a particular kind of driver. Illustrated recess 15 is a Phillips-type recess for receiving the tip of a Phillips-type driver; however, other torque transmitting configurations are embodied in this invention.

Method of Installation

The method by which a user installs an drywall fastener 10 in drywall comprises the steps of providing an elongated drywall fastener 10 having an axis 6, an enlarged head 14 having torque transmitting surfaces 15 therein, a drilling tip 16 generally opposite enlarged head 14, a proximal portion 18 proximate enlarged head 14, an intermediate portion 20, and a distal portion 22 extending to drilling tip 16, wherein the proximal portion 18 has a threaded exterior, with a crest diameter and a thread height, the intermediate portion has a threaded exterior, with a crest diameter substantially smaller than the proximal portion threading crest diameter, and a thread height substantially smaller than the proximal portion thread height, and the distal portion 22 has a threaded exterior with a crest diameter substantially smaller than the proximal portion threading crest diameter, and a thread height substantially smaller than the proximal portion thread height; positioning drilling tip 16 on drywall surface, and driving drywall fastener 10 into drywall so that the distal portion 22 drills through drywall and into any stud or other support member present, and the drywall gripping threading 19 engages a major portion of the thickness of the drywall.

Method of Making

A method of making a drywall fastener 10 comprises the steps of providing a mold having a cavity which has the same shape as drywall fastener 10 so that when the material sets, drywall fastener 10 is formed; feeding molten material, such as a zinc alloy, into the mold cavity, setting the molten material to form a drywall fastener, and removing the drywall fastener from the mold.

Second Embodiment

Referring now to FIGS. 6 to 10, another embodiment of a drywall fastener 110 in accordance with the invention is illustrated. The drywall fastener 110 is similar in most respects to drywall fastener 10 described above. Accordingly, like reference numerals are used to designate like parts, with the prefix 1. The drywall fastener 110 differs primarily in the diameter and taper of the proximal root portion 126, which will be seen to be considerably larger than the diameter and taper of the corresponding proximal root portion 26 in the embodiment of FIGS. 1 through 5. In this embodiment, the proximal root portion 126 has an outer diameter at RD1 of between about 3/16 inch and about 5/16 inch, preferably between about 7/32 inch and about 9/32 inch, still more preferably about ¼ inch. In one embodiment, RD1 is about 0.240 inches. Intermediate portion root diameter 128 at RD3 near distal portion may be between about 1/16 inch and about 3/16 inch, preferably between about 3/32 inch and about 5/32 inch, still more preferably about ⅛ inch. In one embodiment, distal root diameter 128 is about 0.120 in. Accordingly, the proportion of the tapered root is about two to one. This taper defines an angle B of about between about 3 degrees and about 10 degrees, preferably between about 4 degrees and about 7 degrees, still more preferably about 5 degrees. In the embodiment shown in FIG. 8, taper angle B is about 5.00°.

Moreover, the head 114 will be seen to be somewhat thicker than the head 14, with the underside 164 of the head tapering less sharply toward a transitional portion 125 of the body or thread root 26 of the fastener. This transitional portion 125 will be seen to taper upwardly to the increased diameter underside 164 of the head 114, less sharply than the corresponding underside 64 of the head 14. The angle A defined by the underside 164 of the head 114 may be between about 30 degrees and about 70 degrees, preferably between about 40 degrees and about 60 degrees, still more preferably about 50 degrees. In the embodiment shown in FIG. 8, and A is about 51.00°.

The increased maximum diameter of the root in the proximal portion 126, and transitional portion 125 provides additional strength and support for the head 114 and also for the drive recess 115 therein to assure that the fastener 110 can withstand the force of a drive tool entering the drive recess 115 and increased torque required to drive the tip through a substantially harder substrate material underlying a friable material or drywall, in which the fastener is intended for use. In the embodiment of FIGS. 6-10, increased proximal portion root diameter 126 may almost double wall thickness when compared to the embodiment of FIGS. 11-15. Wall thickness may be between about 1/16 inch and about 1/8 inch, preferably between about 1/16 inch and about 3/32 inch. In the embodiment of FIGS. 6-10, wall thickness is about 0.082 inches. However, it will be seen that a lower intermediate portion 128 and a distal portion 130 of the root are substantially similar in diameter to the intermediate portion 28 and distal portion 130 of the fastener of FIGS. 1 through 5. Hence, the amount of taper of the proximal root portion 126 is greater than that of the root portion 26 of the prior embodiment.

Figure 8:
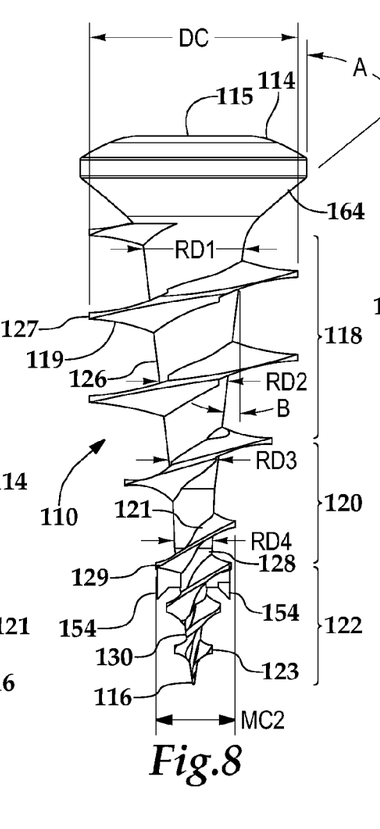
FIG. 8 is a side view of the self drilling drywall fastener of FIG. 6.
Figures 9, 10:
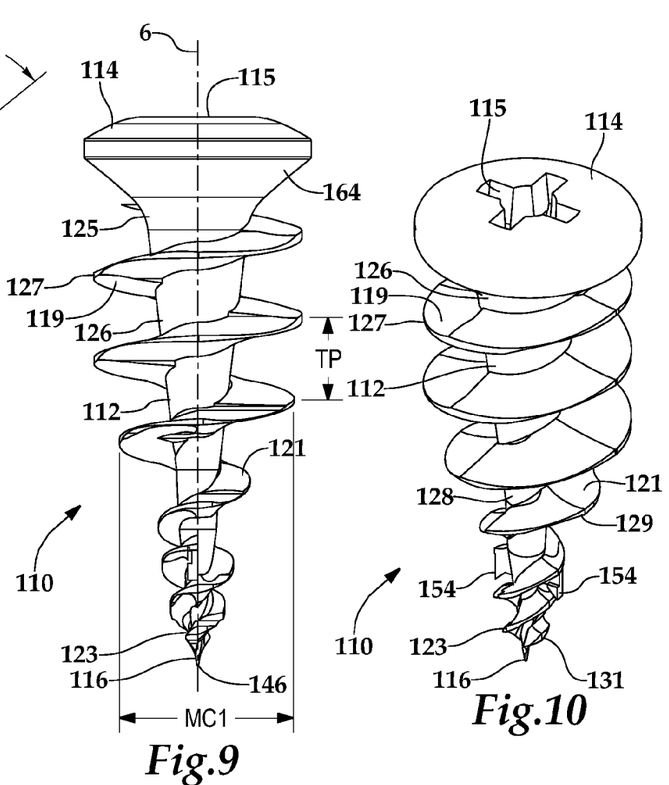
FIG. 9 is a side view of the self drilling drywall fastener, rotated 90° from the view of FIG. 8.
FIG. 10 is a perspective view of the self drilling drywall fastener of FIG. 6.

Accordingly, in the embodiment of FIG. 8, the proximal portion 118 has a threaded exterior, such as drywall gripping threading 119, having a root 126 with an outer diameter of about 0.240 in. Drywall gripping threading 119 may also have a crest 127 with a crest diameter DC, of between about 3/8 inch and about 5/8 inch, preferably between about 7/16 inch and about 9/16 inch, still more preferably about 1/2 inch. In the embodiment of FIG. 8, crest diameter DC of drywall gripping threading is about 0.500 inches. Thus, the ratio of the thread crest diameter to the root diameter may be between about 1½:1 and about 2½:1, preferably between about 1¾:1 and about 2¼:1, still more preferably about 2:1. In the embodiment shown in FIG. 8, the ratio of thread crest diameter to root diameter is about 2.08:1. The intermediate portion 120 has a threaded exterior, such as member gripping threading 121, having a root 128 with an outer diameter between about 1/8 inch and about 1/4 inch, preferably between about 5/32 inch and about 7/32 inch, still more preferably about 3/16 inch. In the embodiment of FIG. 8, intermediate portion 120 root diameter 128 is about 0.185 in. Intermediate portion 120 also has a crest 129 with a crest diameter MC of between about 1/4 inch and about 1/2 inch, preferably between about 5/16 inch and about 7/16 inch, still more preferably about 3/8 inch. In the embodiment of FIG. 8, crest diameter MC is about 0.350 in., that is, substantially smaller than drywall gripping threading crest diameter DC. Thus, the intermediate portion has a thread crest to root diameter ratio of between about 2:1 and about 3:1, preferably between about 2½:1 and about 3:1, still more preferably about 2¾:1. In the embodiment shown in FIG. 8, the ratio of intermediate portion thread crest to root diameter is about 2.70:1. The distal portion 122 has a threaded exterior, such as drilling threading 123, having a root 130 with outer diameter of between about 0 inch and about 3/16 inch, preferably between about 1/16 inch and about 3/16 inch, still more preferably about 1/8 inch. In the embodiment of FIG. 8, distal portion 122 root 130 is about 0.120 in. and tapers toward drilling tip 116. Distal portion 122 has a crest 131 with a crest diameter TC1 of between about 1/16 inch and about 1/4 inch, preferably between about 1/8 inch and about 1/4 inch, still more preferably about 3/16 inch. In the embodiment of FIG. 8, TC1 is about 0.19 in., that is, substantially smaller than drywall gripping threading crest diameter DC. Thus, the ratio of thread crest to root diameter in this distal portion is between about 1:1 and about 2:1, preferably between about 1¼:1 and about 1¾:1, still more preferably about 1½:1. In FIG. 8, the ratio of distal portion thread crest diameter to root diameter is about 1.58:1. It will be noted that the thread root 130 and crest 131 are designated in this embodiment at a somewhat more proximal portion of the fastener than in the first embodiment.

Third Embodiment

Figures 1, 2:
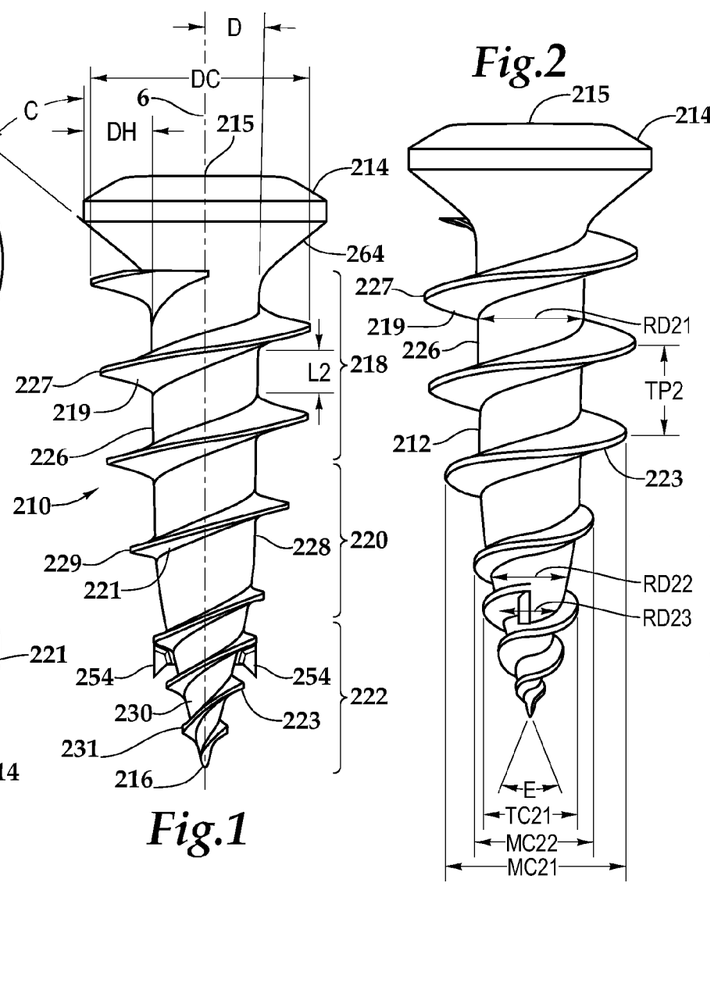
FIG. 1 is a side view of a self drilling drywall fastener according to one embodiment of the present invention.
FIG. 2 is a side view of the self drilling drywall fastener of FIG. 1, rotated 90° from the view of FIG. 1.
Figure 3:
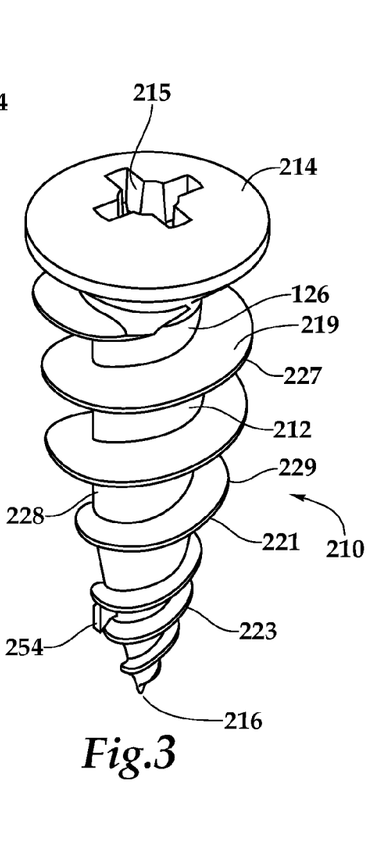
FIG. 3 is a perspective view of the self drilling drywall fastener of FIG. 1.

Referring now to FIGS. 1 to 5, another embodiment of a drywall fastener 210 in accordance with the invention is illustrated. The drywall fastener 210 is similar in most respects to drywall fastener 10 described above. Accordingly, like reference numerals are used to designate like parts, with the prefix 2. The drywall fastener 210 is intended for use in drywall having a thickness of about 0.5 inches and may also be used in drywall having a thickness of about 0.625 inches. The drywall fastener 210 differs primarily in the configuration of the body 212. Proximal root portion 226 will be seen to be considerably larger than the diameter of the corresponding proximal root portion 26 in the embodiment of FIGS. 11 through 15. This increased diameter of proximal root portion 226 allows for head 214 to withstand larger shearing forces and, therefore, for drilling into harder support structures under the drywall than the embodiments described previously. The wall between torque transmitting surfaces 215 and underside 264 of head 214 may be between about 0 inches and about 1/8 inch, preferably between about 0 inches and about 1/16 inch. In the embodiment of FIGS. 1-2, as well as in the second embodiment, wall may be about 0.058 inches thick. In relative terms, wall may be about twice as thick as in the embodiment of FIGS. 11-15 or may be more than twice as thick. Returning to the embodiment of FIGS. 1-5, the proximal root portion 226 has an outer diameter at RD21 of preferably between about 3/16 inch and about 5/16 inch, more preferably between about 7/32 inch and about 9/32 inch, still more preferably about 1/4 inch. In the embodiment of FIG. 2, RD21 is about 0.242 inches. Proximal portion root portion 226 may also have a taper angle D of between about 0 degrees and about 10 degrees, preferably between about 0 degrees and about 5 degrees, more preferably about 1.5°. From the intermediate portion 220 through the distal portion 222 the body of the fastener transitions to an approximately conical shape with an included angle E of between about 15° and about 45°, preferably between about 20° and about 40°, still more preferably about 30°. The overall length of drywall fastener 210 may be between about 1 inch and about 1⅜ inch, more preferably between about 1/4 inch and about 1⅜ inch, still more preferably about 1 3/16 inch. In the embodiment of FIGS. 1-5, drywall fastener may have an overall length of about 1.32 inches with the combined lengths of proximal portion 218, intermediate portion 220 and distal portion 222 being about 1.11 inches.

Moreover, the head 214 will be seen to be somewhat thicker than the head 14, with the underside 264 of the head tapering less sharply toward thread root 226 of the fastener. Underside 264 of head 214 may be generally perpendicular to axis 6 so that it generally sits flush against a front surface of work piece 3. However, the angle C defined by the underside 264 of the head 214 may preferably be between about 40° and about 60°, more preferably between about 45° and about 55°, still more preferably about 50°. In the embodiment of FIG. 1, angle C is about 49°.

The increased maximum diameter of the root 226 in the proximal portion 218, provides additional strength and support for the head 214 and also for the drive recess 215 therein to assure that the fastener 210 can withstand the force of a drive tool entering the drive recess 215 and increased torque required to drive the tip through a substantially harder substrate material underlying a friable material or drywall, in which the fastener is intended for use. This may be accomplished because the increased wall thickness in the underside 264 of head 214 may allow head to withstand larger shearing forces when fastener 210 is driven into a harder support structure behind drywall. However, it will be seen that intermediate portion 220 near proximal portion 218 is substantially similar in diameter to proximal portion 218 but greater in diameter than intermediate portion 20 of the fastener of FIGS. 11 through 15. Intermediate portion 220 begins to taper towards proximal portion 222. Hence, the amount of taper of the distal root portion 222 is greater than that of the root portion 22 of the first embodiment.

In the illustrated embodiment, the proximal portion 218 has a threaded exterior, such as drywall gripping threading 219, having a root 226 with an outer diameter of about 0.242 in., and a crest 227 with a crest diameter DC, of between about ⅜ inch and about ⅝ inch, more preferably between about ⁷⁄₁₆ inch and about ⁹⁄₁₆ inch, still more preferably about ½ inch. In the embodiment of FIG. 1, proximal portion crest diameter DC is about 0.492 inches. Thus, the ratio of the thread crest diameter to the root diameter is about 2.03:1. The intermediate portion 220 has a threaded exterior, such as member gripping threading 221, having a root 228 with an outer diameter between about ³⁄₁₆ inch and about ⁵⁄₁₆ inch, more preferably between about ²⁄₁₀ inch and about ¼ inch, still more preferably about ⁷⁄₃₂ inch. In one embodiment, member gripping threading 221 root 228 is about 0.226 in., and a crest 229 with a maximum crest diameter MC21 of between about ¼ inch and about ½ inch, more preferably between about ⁵⁄₁₆ inch and about ⁷⁄₁₆ inch, still more preferably about ⅜ inch. In the embodiment of FIG. 2, crest diameter MC21 is about 0.353 in. near proximal portion 218, that is, substantially smaller than drywall gripping threading crest diameter DC. Thus, the intermediate portion has a thread crest to root diameter ratio of about 1.56:1 near proximal portion 218. Near distal portion 222, intermediate portion 220 has a root diameter RD22 of between about ¹⁄₁₀ inch and about ²⁄₁₀ inch, more preferably between about ⅛ inch and about ³⁄₁₆ inch, still more preferably about 0.166 inches and a crest MC22 of between about ²⁄₁₀ inch and about ³⁄₁₀ inch, more preferably between about ⁷⁄₃₂ inch and about ⁹⁄₃₂ inch, still more preferably about 0.247 inches. The distal portion 222 has a threaded exterior, such as drilling threading 223, having a root 230 with outer diameter that tapers toward drilling tip 216, a crest 231 with a crest diameter TC21 of about between about ³⁄₁₆ inch and about ¼ inch, more preferably between about ²⁄₁₀ inch and about ⁷⁄₃₂ inch, still more preferably about 0.225 in. near wings 254, that is, substantially smaller than drywall gripping threading crest diameter DC. The root diameter RD23 in this area of distal portion 222 is between about ³⁄₃₂ inch and about ³⁄₁₆ inch, more preferably between about ¹⁄₁₀ inch and about ⁵⁄₃₂ inch, still more preferably about 0.122 inches. Thus, the ratio of thread crest to diameter in this area of distal portion 222 is about 1.84:1 and increases as distal portion 222 tapers to drilling tip 216. The final tapered section of distal portion 222 has a length of between about 0 inches and about ¹⁄₁₆ inch, more preferably about 0.025 inches free of threading that concludes in drilling tip 216.

Thread pitch TP2 is about 0.2 inches throughout this embodiment, including between successive turns of the proximal portion friable material gripping threads, the intermediate portion member gripping threads, and the distal portion drilling threads, including the double threaded distal portion 222. This may provide for increased pullout strength over fasteners with a larger pitch as a greater amount of drywall gripping threading 219 is able to grip drywall 1, a greater amount of member gripping threading 221 is able to grip member 1, or both. In the double threaded distal portion 222 the distance between thread crests is about 0.1 inches but the distance from the crest of one thread to the crest of the same thread is about 0.2 inches. Proximal root 226 has an axial length L2 of about 0.095 inches between threads or about half of pitch TP2 in proximal portion 218.

Distal portion 222 may contain between about 1 and about 2 revolutions, preferably about 1.25 revolutions of double threading as well as two drilling wings 254 that bore a hole in the drywall with a diameter approximately equal to the diameter of root 226 of the proximal portion 218. Overall, distal portion 222 and intermediate portion 220 combined may have between about 1 and about 3 revolutions of double threading. Each wing 254 comprises a generally triangular portion with one leg of the triangle approximately parallel to the outer bore of the hole to be drilled and a vertex of the triangle disposed generally towards the drilling tip 216. Preferably, wing 254 is directed in an axial direction toward drilling tip to allow wing 254 to enter drywall 1 cleanly and not ream out more drywall than necessary, which may result in reduced pullout strength. Wing 254 is attached to distal portion 222 at both root 230 and drilling thread 223. Wing 254 may have a thickness between about 20/1000 inch and about 40/1000 inch, preferably about ¹⁄₃₂ inch and is designed to break off of distal portion 222 if the wing 254 encounters a hard underlying support material.

Figure 16:
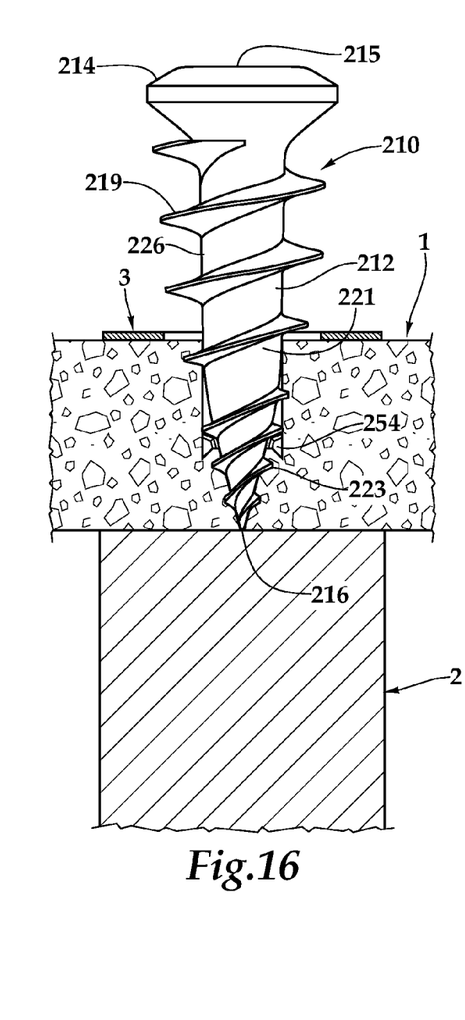
FIG. 16 is a side view of the self drilling drywall fastener of FIG. 1 in the process of being installed but immediately before it contacts the underlying support member.
Figure 17:
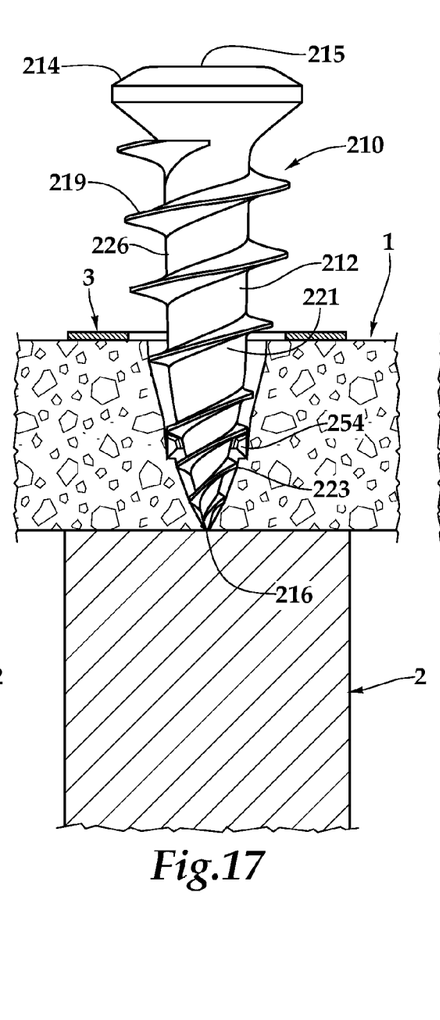
FIG. 17 is the drywall fastener of FIG. 16 after stalling has occurred but before the drywall fastener draws into the underlying support member.
Figure 18:
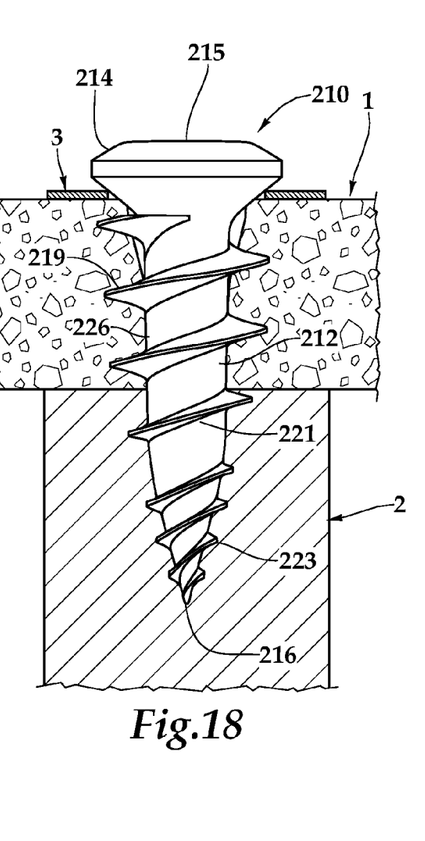
FIG. 18 is the drywall fastener of FIGS. 16 and 17 with installation completed.

In this embodiment of the invention, FIGS. 16-18 show various states of installation into drywall with a support member opposite the point of entry into drywall 1. FIG. 16 shows drywall fastener 210 having been driven through drywall 1 and initially contacting support member 2. Wings 254 have bored a hole in drywall 1 about the same diameter as proximal root 226. FIG. 17 shows the installation of drywall fastener 210 at a point shortly after the point shown in FIG. 16. When drilling tip 216 contacts support member 2, drywall fastener 210 stalls, which refers to the process that occurs when drywall fastener 210 stops advancing or advances at a slower rate through drywall 1 due to encountering relatively harder underlying support member 2. Stall occurs until drilling thread 223 advances sufficiently into support member 2 to begin drawing drywall fastener 210 through drywall 1 and support member 2. During the stall period drilling thread 223, wings 254, and any portion of member gripping threading 221 which has advanced into drywall 1, remove material from drywall 1. Because drilling thread 223 and member gripping threading 221 have crest diameters substantially smaller than drywall gripping threading 219, stalling creates a bore through which body 212 can advance without damaging drywall 1 yet still leaving sufficient material upon which drywall gripping threading 219 may act. FIG. 18 shows drywall fastener 210 fully engaged in drywall 1 and support member 2, fixing work piece 3 in place. At the point where wings 254 engage support member 2, occurring between the positions shown in FIG. 17 and FIG. 18, wings 254 break off decreasing installation torque and allowing member gripping threading 221 to act on support member 2.

The novel drywall fastener of the present invention allows a user to install the drywall fastener in drywall without being concerned about whether or not a stud member is located behind the drywall at the drywall fastening location or, as may be the case, when it is known that there is a stud member present.

Drywall fastener 10 is designed to provide increased pullout strength over traditional fasteners whether or not it drills into a support member 2 behind drywall 1. However, drywall fastener 10 may also function properly and provide increased strength if it hits at or near an edge of a support member. In this case, if drilling tip 216 hits near the edge of support member 2, drilling tip 216 combined with drilling threads 223 may remain embedded in support member 2 instead of deflecting away from support member.

As seen in FIG. 1, thicker proximal portion 218 allows underside surface 264 of enlarged head 214 to be thicker than in the embodiment of FIG. 12. Similar to the embodiment of FIGS. 6-10, increased proximal portion 218 root diameter may almost double wall thickness when compared to the embodiment of FIGS. 11-15. Wall thickness may be between about $1/16$ inch and about $1/8$ inch, preferably between about $1/16$ inch and about $3/32$ inch. In the embodiment of FIGS. 11-15, wall thickness may be about 0.082 inches. This may allow torque transmitting surface 215 to extend further longitudinally into elongated body 212, which translates into improved performance when driving drywall fastener 210, due to a diminished or eliminated wobble of drywall fastener 210 or driver (not shown) camming out of the recess 215 during high torque installation, such as when distal portion 222 drills into support member 2. Staying with FIG. 1, enlarged head 214 may be crowned so that walls of enlarged head extend in a generally axial direction and then taper toward torque transmitting surfaces. Axially extending portion allows walls of enlarged head to be thicker, enabling fastener 210 to withstand larger installation torques and resist shearing between enlarged head 214 and proximal portion 218 that may be experienced when drilling into members with larger hardness values. However, enlarged head 214 may also have one of various shapes commonly used in the art. For example, enlarged head 214 may be without crowning and may be generally flat when moving from one radial side across axis 6 to another radial side. This may allow fastener 210 to sit flush against a surface of work piece 3 when fastener 210 is installed.

Underside 264 of enlarged head 214 may be inclined relative to axis 6. The incline, as measured by angle C, may serve multiple purposes. It may be designed to match with a countersink (not shown) in work piece 3, enabling enlarged head 214 to sit at least partially below a surface of work piece 3. Countersink may provide positive grip and seating, distributing the applied load of work piece 3 around a larger portion of underside 264 of enlarged head 214. In addition, it may allow work piece 3 to sit more flush against drywall 1. Selecting a value for angle C may vary depending on an intended use or design parameter. The larger angle C is, the greater the amount of enlarged head 214 that may sit below a surface of work piece 3. Conversely, the smaller angle C is, the thicker the underside 264 of enlarged head 214 may be, increasing its ability to withstand the torsional forces required to install fastener 210, especially when drilling into a support member 2.

Figure 4:
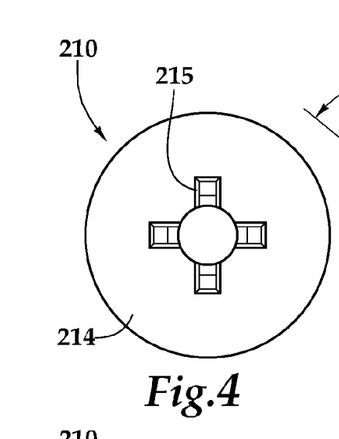
FIG. 4 is a top view of the self drilling drywall fastener of FIG. 1.
Figure 5:
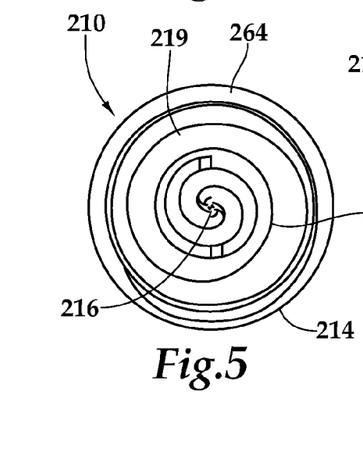
FIG. 5 is a bottom view of the self drilling drywall fastener of FIG. 1.
Figure 6:
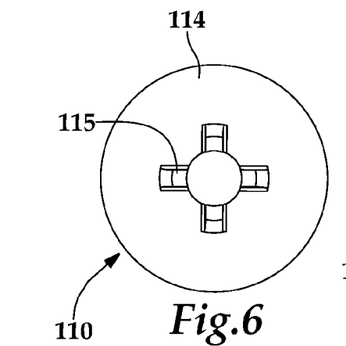
FIG. 6 is a top view of another embodiment of a self drilling drywall fastener of FIG. 1.
Figure 7:
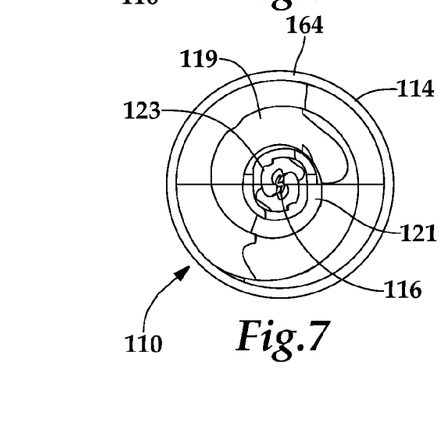
FIG. 7 is a bottom view of the self drilling drywall fastener of FIG. 6.

As can be seen in FIGS. 1 and 4, fastener 210 may have a Phillips-type recess for receiving the tip of a Phillips-type driver. Phillips-type recess may comprise transverse recesses. In addition, as seen in FIG. 4, Phillips-type recess may further comprise generally arc-shaped recesses connecting adjacent transverse recesses. Generally arc-shaped recess may allow for various configurations of Phillips-type recesses. Further, they may allow tip of rotary driver (not shown) to extend further into recess, providing better positive engagement and driving of fastener 210. Moreover, Phillips-type recess may be designed so that rotary driver cams out of recess when fastener 210 is fully driven, so as to prevent over-tightening of fastener 210.

Turning to FIG. 2, drywall gripping threading 219 may be designed to prevent an unsightly appearance of front surface of drywall 1. Drywall gripping threading 219 may be truncated at a proximal end proximate the underside 264 of enlarged head 214 to form a generally flat rearward-facing land that may be generally perpendicular to axis 6. Instead of continuing to push loosened drywall toward underside of enlarged head 214, this may create an unthreaded neck portion of fastener in which the drywall is compressed between the outer drywall 1 surface and the high drywall gripping threading 219. In addition, the generally flat rearward-facing land may prevent drywall gripping threading 219 from snagging a front surface of drywall 1 since snagging paper on the front surface of drywall 1 may result in a cosmetically unsightly final appearance or may inhibit article 3 from sitting flush against front surface of drywall 1. Unthreaded neck, i.e. the distance between the generally flat rearward facing land and enlarged head 214 may be between about $1/32$ inch and about $1/10$ inch, preferably between about $4/100$ inch and about $3/32$ inch, still more preferably about $6/100$ inch.

Threading 219, 221, 223 of fastener 210 may be generally narrow such that there are sections of unthreaded root on body 212 of fastener 210 between successive turns of threading 219, 221, 223. In addition, threading may have a small land or radius of curvature between forward facing and rearward facing sides of threading at a radially outermost portion of threading 219, 221, 223. Land or radius of curvature may be between about 0 inch and about $1/16$ inch thick. Preferably land or radius of curvature may be about 0 inch thick to facilitate threading 219, 221, 223 moving through drywall 1 with diminished resistance and minimal drywall disturbed. However, manufacturing tolerances or molding requirements may compel land or radius of curvature be larger than about 0 inch thick.

As can be seen in FIGS. 1 and 2, both elongated body 212 and threading 219, 221, 223 may taper from proximal end to distal end of fastener 210. Both body 212 and threading may taper at generally similar relative degrees, such that as taper of body 212 increases when moving from intermediate portion 220 to distal portion 222, drilling threading 223 may taper by a generally similar amount. However, body 212 may taper either more or less rapidly than threading 219, 221, 223. Proximal root portion may taper between about 0 degrees and about 10 degrees, preferably between about 0 degree and about 5 degrees, still more preferably about 1.5 degrees.

Turning to FIG. 2, the angle E at which distal portion tapers may also represent the angle of drilling tip 216. Angle E is relatively narrow and may provide for positive, quick engagement of fastener 10 into support member 2. Quick engagement is preferred because, otherwise, drywall gripping threads 219 may start to strip out drywall 1 and start to auger drywall material 1 toward a front surface of drywall 1, reducing pullout strength. Augered drywall that accumulates near the front surface of drywall 1 may also be aesthetically unpleasing, causing drywall 1 to tear, or form a bump or other distortion near the front surface. Angle E may be between about 20 degrees and about 40 degrees, preferably between about 25 degrees and about 35 degrees, still more preferably about 30 degrees.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A self drilling fastener for use in a friable material with or without an underlying support member at the point of use, comprising:

an elongated body having an axis, a threaded exterior having a root, and an enlarged head having torque transmitting surfaces therein, a proximal portion, an intermediate portion, a distal portion, and a drilling tip generally opposite said enlarged head;

wherein said body is solid along said proximal portion;

said proximal portion having an axial length and threads for gripping said friable material having a root with a root diameter between about 3/16 inch and about 5/16 inch, a crest with a crest diameter between about 3/8 inch and about 5/8 inch, and a thread height, wherein said crest diameter is about twice said root diameter;

said intermediate portion having an axial length and threads for gripping said member having a root that tapers with a root diameter between about 1/8 inch and about 5/16 inch, a crest with a crest diameter between about 1/4 inch and about 1/2 inch, and a thread height substantially smaller than said thread height of said proximal portion;

said distal portion having an axial length and threads for drilling into said member with a root with a root diameter between about 1/16 inch and about 3/16 inch that tapers toward said drilling tip, a crest with a crest diameter substantially smaller than said crest diameter of said proximal portion, and a thread height substantially smaller than said thread height of said proximal portion.

2. A self drilling fastener according to claim 1, wherein said friable material gripping thread root diameter is between about 7/32 inch and about 9/32 inch.

3. A self-drilling fastener according to claim 2, wherein said friable material gripping thread root diameter is at least about 1/4 inch.

4. A self-drilling fastener according to claim 1, wherein said friable material gripping thread crest diameter is between about 7/16 inch and about 9/16 inch.

5. A self-drilling fastener according to claim 4, wherein said friable material gripping thread crest diameter is about 1/2 inch.

6. A self-drilling fastener according to claim 1, wherein said member gripping thread root diameter is between about 5/32 inch and about 7/32 inch.

7. A self-drilling fastener according to claim 6, wherein said member gripping thread root diameter is about 3/16 inch.

8. A self-drilling fastener according to claim 1, wherein said member gripping thread root diameter is between about /2;10 inch and about 1/4 inch.

9. A self-drilling fastener according to claim 8, wherein said member gripping thread root diameter is about 7/32 inch.

10. A self-drilling fastener according to claim 1, wherein said member gripping thread crest diameter is between about 5/16 inch and about 7/16 inch.

11. A self-drilling fastener according to claim 10, wherein said member gripping thread crest diameter is about 3/8 inch.

12. A self drilling fastener according to claim 1, wherein said drilling threads of said distal portion comprise a pair of threads each having a lead proximate said drilling tip.

13. A self drilling fastener for use in a friable material with or without an underlying support member at the point of use, comprising:

an elongated body having an axis, a threaded exterior having a root, and an enlarged head having torque transmitting surfaces therein, a proximal portion, an intermediate portion, a distal portion, and a drilling tip generally opposite said enlarged head;

wherein said body is solid along said proximal portion;

said proximal portion having an axial length and threads for gripping said friable material having a root with a root diameter between about 3/16 inch and about 5/16 inch, a crest with a crest diameter between about 3/8 inch and about 5/8 inch, and a thread height, wherein said crest diameter is about twice said root diameter;

said intermediate portion having an axial length and threads for gripping said member having a root that tapers with a root diameter between about 1/8 inch and about 5/16 inch, a crest with a crest diameter between about 1/4 inch and about 1/2 inch, and a thread height substantially smaller than said thread height of said proximal portion;

said distal portion having an axial length and threads for drilling into said member with a root with a root diameter between about 1/16 inch and about 3/16 inch that tapers toward said drilling tip, a crest with a crest diameter substantially smaller than said crest diameter of said proximal portion, and a thread height substantially smaller than said thread height of said proximal portion;

wherein said root of said proximal portion has a radius, said fastener further comprising at least one wing protruding radially from said distal portion to a distance from said axis approximately equal to said root radius.

14. A self drilling fastener according to claim 1, wherein said axial length of said proximal portion is approximately equal to a thickness of said friable material; and a combined axial length of said distal portion axial length and said intermediate portion axial length is greater than the thickness of the friable material.

15. A self drilling fastener according to claim 1, wherein said threads for gripping said friable material have a pitch and said root of said proximal portion between successive turns of said threads has an axial length of about one-half of said pitch.

16. A self drilling fastener according to claim 1, wherein said intermediate portion tapers toward said distal portion at a generally constant first angle with respect to said axis, and wherein said distal portion tapers toward said drilling tip at a generally constant second angle with respect to said axis, said first angle being smaller than said second angle.

17. A self drilling fastener for use in a friable material with or without an underlying support member at the point of use, comprising:

a head having torque transmitting surfaces, an elongate body having an axis, a proximal end, a proximal portion adjacent said proximal end, a drilling end opposite said proximal end, and a distal portion adjacent said drilling end;

said proximal portion with a high exterior thread having a height and having a root;

said distal portion with an exterior thread having a height smaller than said proximal portion high thread height and having a root;

wherein said body is solid along said proximal portion;

wherein said distal portion root tapers toward said drilling end, wherein said proximal portion thread has a crest diameter that tapers toward said distal portion and said distal portion thread has a crest diameter that tapers toward said drilling end, said distal portion thread tapering at a larger rate than said proximal portion thread;

wherein said proximal portion thread, said proximal portion root, said distal portion thread and said distal portion root together provide sufficient structural support to said body to withstand a torsion force required for the drilling end to penetrate a substrate supporting the friable material, the substrate having a hardness greater than the hardness of the friable material; and wherein said proximal portion root is about one-half said proximal portion height, allowing a wall between said torque transmitting surfaces and an underside of said head to be enlarged to withstand increased shearing forces generated when said fastener penetrates said substrate.

18. A self-drilling fastener according to claim 17, wherein said wall is between about 1/16 inch and about 3/32 inch thick.

19. A self drilling fastener according to claim 17, said body further comprising an intermediate portion between said proximal portion and said distal portion, having a thread with a height smaller than said proximal portion high thread height, wherein an axial length of the intermediate portion and the distal portion is greater than a thickness of the friable material.

20. A self drilling anchor according to claim 17, said body further comprising at least one wing protruding radially outwardly from said distal portion and generally towards said drilling end and terminating in a pointed end.

* * * * *